(12) United States Patent
Raaymakers et al.

(10) Patent No.: US 8,013,886 B2
(45) Date of Patent: Sep. 6, 2011

(54) SYSTEM FOR SCRIBING A VISIBLE LABEL

(75) Inventors: Jeroen Arnoldus Leonardus Johannes Raaymakers, Eindhoven (NL); George Alois Leonie Leenknegt, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1227 days.

(21) Appl. No.: 11/573,953

(22) PCT Filed: Aug. 24, 2005

(86) PCT No.: PCT/IB2005/052769
§ 371 (c)(1),
(2), (4) Date: Feb. 20, 2007

(87) PCT Pub. No.: WO2006/021931
PCT Pub. Date: Mar. 2, 2006

(65) Prior Publication Data
US 2009/0040895 A1 Feb. 12, 2009

(30) Foreign Application Priority Data

Aug. 27, 2004 (EP) .................................. 04104116
Dec. 7, 2004 (EP) .................................. 04106344

(51) Int. Cl.
*B41J 2/435* (2006.01)

(52) U.S. Cl. ..................................... 347/224

(58) Field of Classification Search .................. 347/224, 347/225; 369/44.25–44.27, 44.29, 53.28, 369/53.35–53.37
See application file for complete search history.

(56) References Cited

U.S. PATENT DOCUMENTS

| | | | | |
|---|---|---|---|---|
| 4,512,003 A * | 4/1985 | Kimura et al. | ............. | 369/44.29 |
| 4,992,652 A * | 2/1991 | Okada | ......................... | 250/201.4 |
| 5,663,942 A * | 9/1997 | Ishibashi et al. | ............ | 369/53.34 |
| 6,252,835 B1 * | 6/2001 | Choi | .......................... | 369/44.29 |
| 6,490,234 B1 * | 12/2002 | Okamoto et al. | ............ | 369/44.25 |
| 7,142,487 B2 * | 11/2006 | Wu | ............................. | 369/44.29 |
| 7,646,691 B2 * | 1/2010 | Morishima | ................. | 369/53.23 |
| 2002/0191517 A1 | 12/2002 | Honda et al. | | |
| 2004/0001411 A1 | 1/2004 | Morishima | | |
| 2004/0004912 A1 | 1/2004 | Morishima | | |
| 2004/0125730 A1 | 7/2004 | Yamamoto | | |

FOREIGN PATENT DOCUMENTS

| | | |
|---|---|---|
| EP | 1367570 A2 | 12/2003 |
| JP | 11337442 A * | 12/1999 |
| WO | 2006006102 A1 | 1/2006 |

* cited by examiner

Primary Examiner — Hai C Pham

(57) ABSTRACT

A device is for scribing a visible label on the medium includes a head for providing a beam and generating a detector signal in dependence of radiation reflected from the medium, and a focus unit or generating a focus control signal for focusing the beam. A label control unit controls the scribing in dependence of label data. The focus unit detects a focus error by including a focus excitation signal in the focus control signal and detecting a deviation in the detector signal in dependence of the focus excitation signal. The label control unit is for controlling the focus unit in dependence on the label data to detect the focus error during said scribing and without interrupting said scribing.

10 Claims, 4 Drawing Sheets

Figure 2:
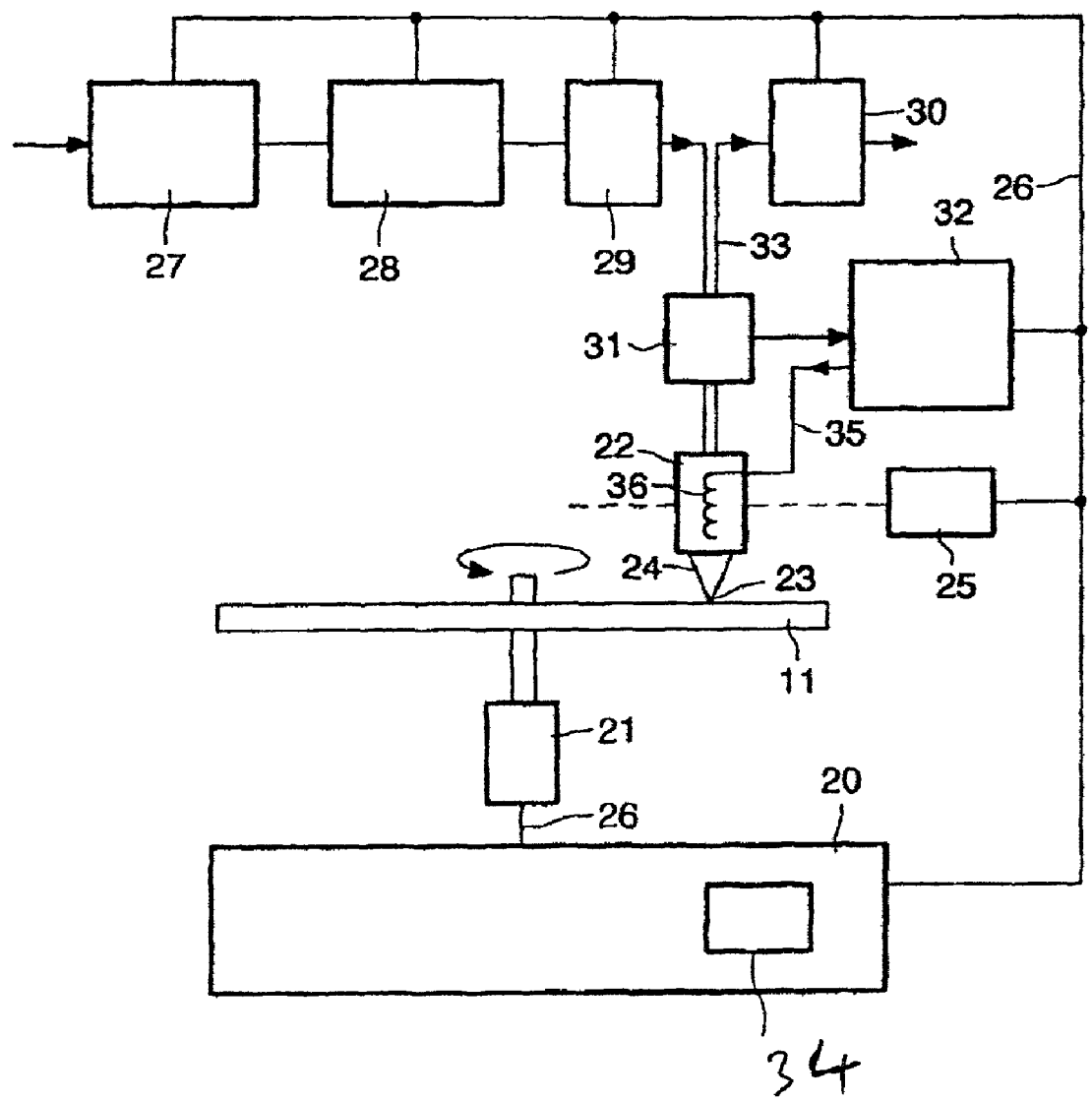

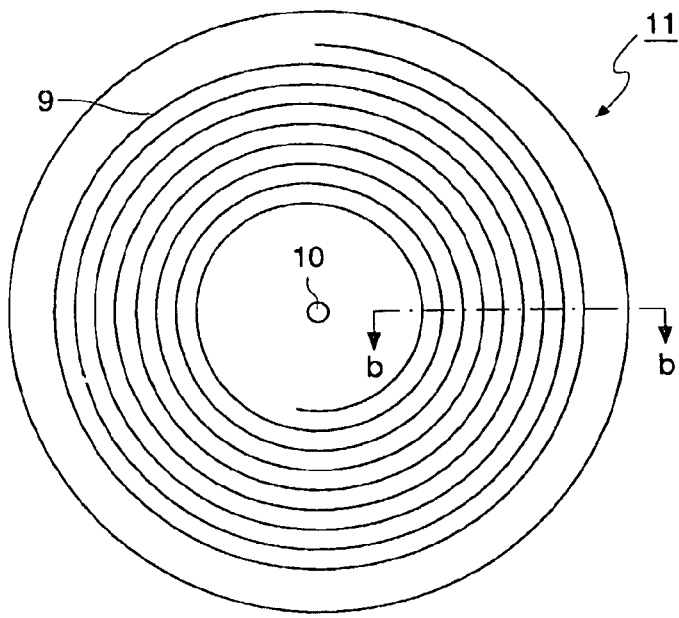
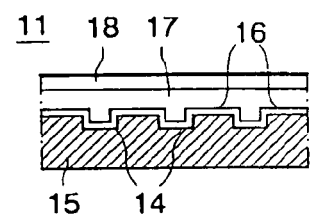
FIG.1b
FIG.1a
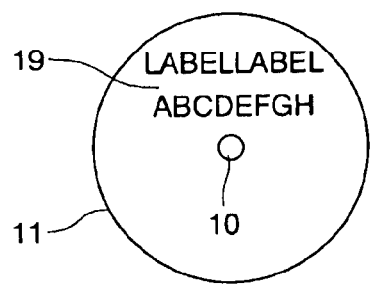
FIG.1c

SYSTEM FOR SCRIBING A VISIBLE LABEL

The invention relates to a device for scanning a medium and scribing a visible label on the medium, the medium having a label side provided with a radiation sensitive layer for creating the visible label by scribing traces of dots via a beam of radiation, the device comprising a head for providing the beam of radiation for, in a label mode, generating a scribing spot on the radiation sensitive layer for scribing the visible label, and for generating at least one detector signal in dependence of radiation reflected from the medium, a control unit comprising label control means for controlling the scribing in dependence of label data, and focus means for generating a focus control signal for focusing the scribing spot.

The invention further relates to a method of scribing a visible label on a medium via a beam of radiation for use in the scanning device.

The patent application US 2002/0191517 describes an optical disc device and a method of printing a label on an optical disc. The label is created by utilization of a laser beam output from a head of the optical disc device. It is noted that in the current document the word scribing is used for indicating the process of changing the visible light characteristic of a radiation sensitive layer for creating a visible label on a medium, e.g. for printing a text on an optical disc.

In optical recording devices information is stored on a record carrier by writing marks in a track. The optical recording device is equipped with a head to focus a laser beam into a scanning spot on a track on a recording layer of the record carrier. Focusing is based on detector signals generated by a detector in the head from radiation reflected from the track and/or the marks. The head is radially positioned on the track via a servo system based on a radial error signal derived from the detector signals.

In the known document scribing a label via the head of an optical recording device is described. A visible light characteristic changing layer formed from photosensitive or heat-sensitive material is formed in a location which can be viewed from a part of a label surface of an optical disk. The optical disk is set on a turntable of an optical disk unit while the label surface of the optical disk is directed towards the optical head. The optical disk and head are moved mutually to cover a label area along the plane of the optical disk. In synchronism with the relative movement, the power of a laser beam output from the optical pickup is modulated in accordance with image data, such as characters or graphic images to be printed, and the laser beam is emitted onto the visible light characteristic changing layer. As a result of the visible light characteristic changing layer being exposed to the laser beam, a visible-light reflectivity of the visible light characteristic changing layer is changed, thereby forming an image corresponding to the image data on the label surface. According to the document focusing of the beam during scribing is based on detector signals generated by a detector in the head from radiation reflected from the medium.

A problem of the known system of label scribing is that the quality of the label is unreliable due to difficulties of generating a reliable focus error signal during scribing.

Therefore it is an object of the invention to provide a device and method for reliably focusing the beam while scribing a label on a medium at a high quality.

According to a first aspect of the invention the object is achieved with a device as defined in the opening paragraph, in which device the focus means are arranged for detecting a focus error by including a focus excitation signal to the focus control signal and detecting a deviation in the detector signal in dependence of the focus excitation signal, the label control means being arranged for controlling the focus means in dependence on the label data to detect the focus error during said scribing and without interrupting said scribing.

According to a second aspect of the invention the object is achieved with a method as defined in the opening paragraph which method comprises the steps of controlling the scribing in dependence of label data, and controlling the focus means in dependence on the label data to detect the focus error during said scribing and without interrupting said scribing.

The effect of including the focus excitation signal is that a focus error signal can be reliably detected, due to the fact that a deviation of the detector signal is to be expected, and is detectable, in correlation with the focus excitation signal. Label data is the digital information indicating the type of dots to be sequentially scribed in adjacent traces of dots, e.g. a dark type of dot by a high radiation power and a white type of dot by a low radiation power or zero radiation power. Controlling the focus means to detect the focus error in dependence of the label data during scribing provides the focus error information during scribing, and hence provides control over the quality of the scribed label. Not interrupting the scribing for a measurement, e.g. on a different location, has the advantage that the total time for scribing the label is minimized.

The invention is also based on the following recognition. The inventors have noted that in an information recording device the optical head and detector are necessarily designed to generate a scanning spot on the recording layer of a medium via a substrate of known optical properties. For example, the optical elements are designed to compensate a known amount of spherical aberration caused by the substrate. The optical elements and detector signals for focusing are designed for following a track in a buried recording layer. However, in label scribing, the label surface does not have tracks, and the beam does not pass the substrate. Nevertheless the inventors have seen that detector signals occurring while a scribing spot is generated on the label sensitive layer can unexpectedly be put to generate a focus error signal. However, the optical properties of the reflected radiation do not allow reliably using the conventional focusing methods. The inventors have seen that a reliable focus error signal is generated by including a focus excitation signal, while the quality of the label remains substantially unaffected by controlling the focus detecting process in dependence of the label data.

In an embodiment of the device the label control means are arranged for controlling the focus excitation signal and/or detecting said deviation in dependence on the label data. This has the advantage that a by adjusting the properties of the focus excitation signal and/or selectively detecting said deviation the focus error signal is more reliable, in particular because the disturbing effects of the type of dots are reduced.

In an embodiment of the device the focus excitation signal is a periodic excitation signal having a first amplitude during a learning process while not scribing and a second amplitude during said scribing, the second amplitude being substantially smaller than the first amplitude. This has the advantage that after initially, i.e. before scribing, determining a focus control signal that corrects large focus errors, the amplitude of the focus excitation signal during scribing is relatively small, which reduces visible effects thereof.

In an embodiment of the device the focus excitation signal is a periodic excitation signal having a first frequency during a learning process while not scribing and a second frequency during said scribing, the second frequency being substantially different from the first frequency. During the learning process before scribing a focus correction signal that corrects large focus errors is determined. During scribing the frequency is adapted to provide an appropriate number of measurements taking into account the label data, e.g. a higher frequency allowing a sample value to be calculated in a small section of a trace. This has the advantage that during scribing the focus correction signal is updated for compensating changes of the focus error.

In an embodiment of the device the label control means are arranged for only enabling detecting said deviation in selected sections of the traces of dots, which selected sections substantially only contain uncolored dots at which uncolored dots the radiation sensitive layer is unaffected. Uncolored dots may have a lighter color, i.e. have the original color of the radiation sensitive label layer and are usually called white dots, while colored dots, usually called black dots, are formed by applying a high laser power to the radiation sensitive layer. This has the advantage that the focus error signal is only based on a single type of dots, and is not affected by the contents of the label.

In an embodiment of the device the label control means are arranged for only including the focus excitation signal in selected parts of the traces of dots, which selected parts substantially only contain uncolored dots at which uncolored dots the radiation sensitive layer is unaffected. This has the advantage that the quality of the label in areas containing colored dots is substantially unaffected by the focus detection process.

In an embodiment of the device the focus excitation signal is symmetrical with respect to a center of a detection period, and the focus means are arranged for detecting said deviation in the detector signal by only detecting the detector signal only for pairs of periods corresponding to pairs of, with respect to the center of the detection period, symmetrically positioned dots of a same type. For example only the detector signals of pairs of dots of an uncolored type are used for calculating the focus error signal, or all suitable pairs are used.

This has the advantage that the focus error signal is only based on a same type of dots while balancing effects of small defocusing due to the focus excitation signal, and is not affected by the contents of the label.

Further preferred embodiments of the device and method according to the invention are given in the appended claims, disclosure of which is incorporated herein by reference.

Figure 3:
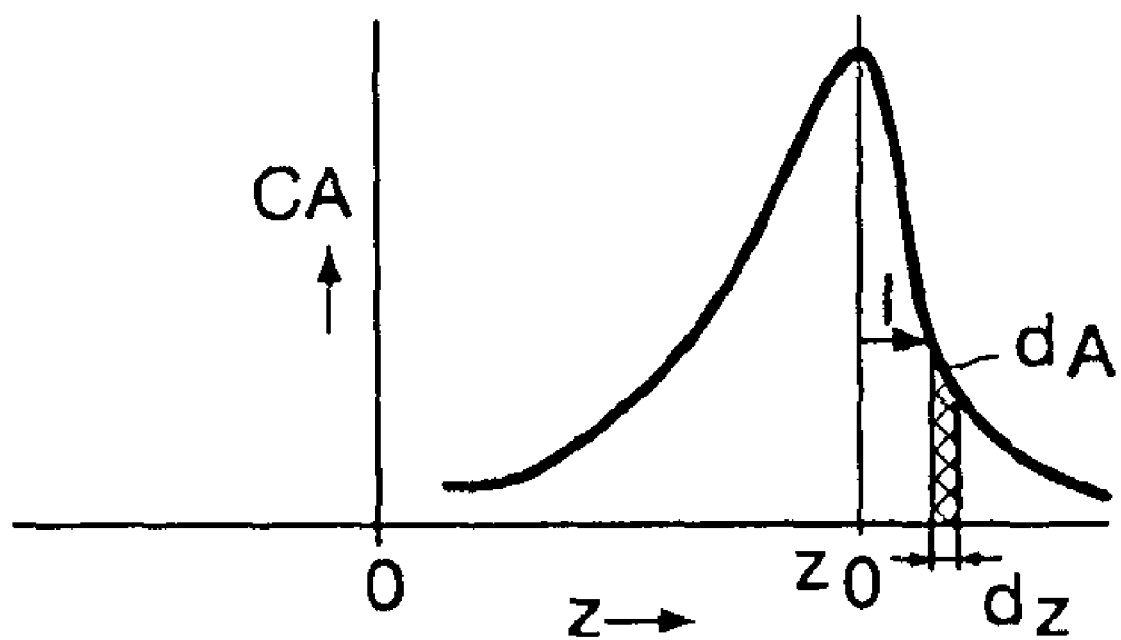
Figure 4:
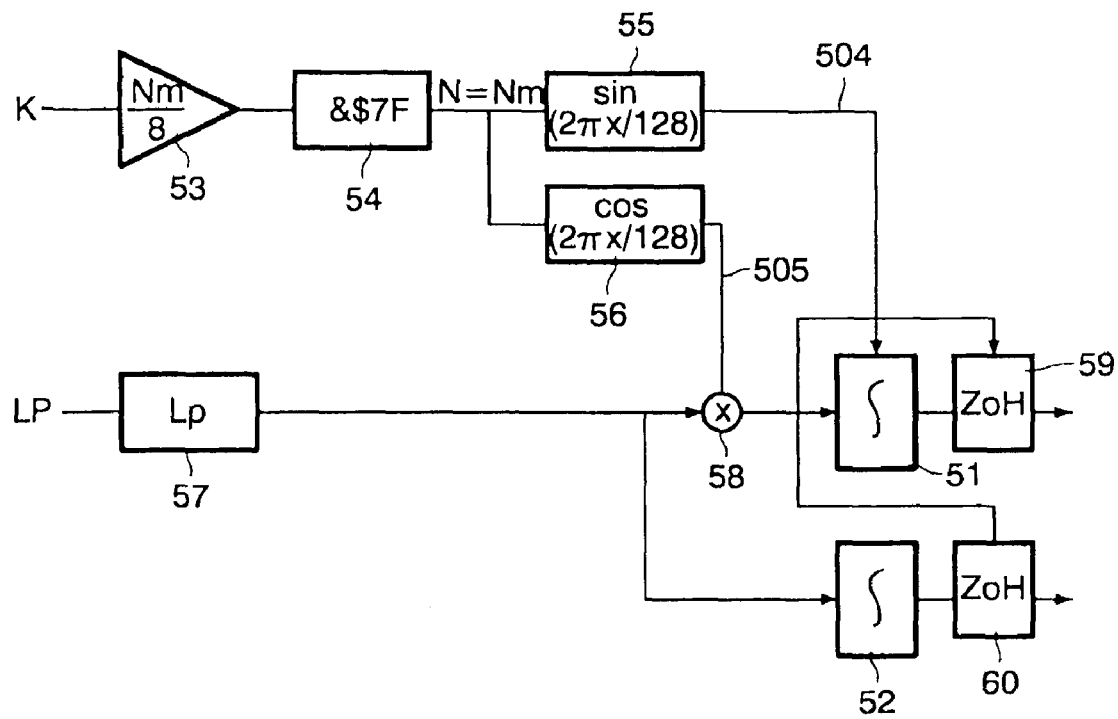
Figure 4:
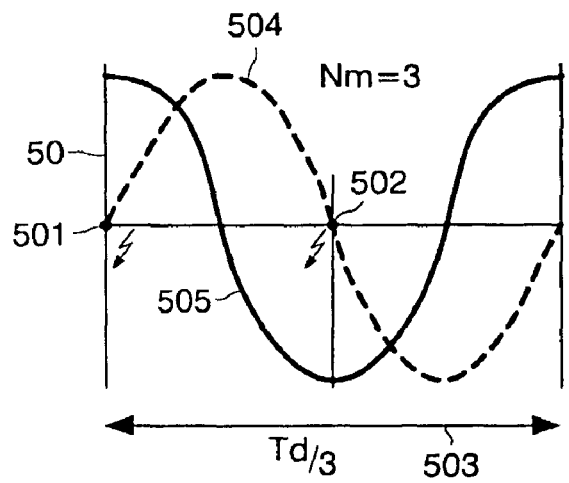

These and other aspects of the invention will be apparent from and elucidated further with reference to the embodiments described by way of example in the following description and with reference to the accompanying drawings, in which FIG. 1a shows a disc-shaped record carrier,
FIG. 1b shows a cross-section taken of the record carrier,
FIG. 1c shows a label on a record carrier,
FIG. 2 shows a scanning device having label scribing,
FIG. 3 shows detecting a center of gravity, and
FIG. 4 shows a detector signal processing part.

In the Figures, elements which correspond to elements already described have the same reference numerals.

FIG. 1a shows a disc-shaped record carrier. A cross-section is shown in FIG. 1b, and FIG. 1c shows a label side of the record carrier. The record carrier 11 has a track 9 on an information layer and a central hole 10. The track 9 is arranged in accordance with a spiral or concentrical pattern of turns constituting substantially parallel tracks on the information layer. The record carrier may be an optical disc having an information layer of a recordable type. Examples of a recordable disc are the CD-R and CD-RW, and the DVD-R or DVD+RW, and/or BD (Blu-ray Disc). The track 9 on the recordable type of record carrier is indicated by a pre-embossed track structure provided during manufacture of the blank record carrier, for example a pregroove. Recorded information is represented on the information layer by optically detectable marks recorded along the track. The marks are to be read, and optionally written, via a beam of radiation, e.g. a laser beam generated in an optical head in an optical disk drive. The marks are constituted by variations of one or more physical parameters and thereby have different optical properties than their surroundings, e.g. variations in reflection obtained when recording in materials such as dye, alloy or phase change material, or variations in direction of polarization, obtained when recording in magneto-optical material.

FIG. 1b shows a cross-section taken along the line b-b of the record carrier 11 of the recordable type, in which a transparent substrate 15 is provided with a recording layer 16 and a protective layer 17. The track structure is constituted, for example, by a pregroove 14 which enables an optical head to follow the track 9 during scanning. The pregroove 14 may be implemented as an indentation or an elevation, or may consist of a material having a different optical property. A track structure may also be formed by regularly spread sub-tracks which periodically cause servo signals to occur. The record carrier may be intended to carry real-time information, for example video or audio information, or other information, such as computer data. On top of the protective layer 17 a label layer 18 is provided that is sensitive to radiation for scribing a visible label. Scribing is a process of changing the visible light characteristic of the radiation sensitive layer 18 for creating the visible label.

FIG. 1c shows a label on a record carrier. The record carrier 11 is shown from the label side, and a visual label 19 has been scribed in the radiation sensitive layer. The visual label elements, e.g. black dots, are scribed in the label layer 18 by applying a scribing spot and scanning the label layer in radial and angular position while modulating the power of the beam of radiation. A system for scribing visible labels is for example known from US 2002/0191517.

Note that the examples are based on a record carrier that has the radiation sensitive label layer on a different side of the record carrier then the entry side for recording and reading information. However, a label layer of a suitable material may be located at the entry side. Such a label layer has to be at least partly transparent to the radiation for recording and reading information from the marks in the track. Furthermore, the label layer may only be applied to a part of the label side. Obviously label elements can only be scribed at the part covered by the label layer.

FIG. 2 shows a recording device having label scribing. The device is provided with means for scanning a record carrier 11, which means include a drive unit 21 for rotating the record carrier 11, a head 22, a servo unit 25 for radially positioning the head 22 and a control unit 20. The head 22, also called OPU (Optical Pickup Unit), comprises an optical system of a known type for generating a radiation beam 24 guided through optical elements focused to a radiation spot 23. The radiation beam 24 is generated by a radiation source, e.g. a laser diode.

In a data recording mode the radiation spot is generated on a track of the information layer of the record carrier. In a label scribing mode the radiation spot is focused on the radiation sensitive layer on the label side of the medium 11. The head further comprises a focusing actuator 36 for focusing the beam to the radiation spot by moving the focus of the radiation beam 24 along the optical axis of said beam, and a radial actuator (not shown) for fine positioning of the spot 23 in a radial direction, e.g. coils for radially moving an optical element.

The radiation reflected from the medium is detected by a detector of a usual type in the head 22. A front-end unit 31 is coupled to the detector for providing detector signals based on radiation reflected from the track. The detector signals may include a main scanning signal 33 for reading the marks and sub-detector signals, for example a push-pull sub-detector signal based on the radiation as reflected from a left and right side of the track respectively and/or a satellite sub-detector signal based on the radiation as reflected from separate satellite spots positioned to the left and right side of the center of the track.

Detector signals for focusing are coupled to a focus unit 32 for controlling said focusing actuator 36 via a focus control signal 35 as described below. The main scanning signal 33 is processed by read processing unit 30 of a usual type including a demodulator, deformatter and output unit to retrieve the information. For the label mode the detector signals for focusing may include a sum reflection signal indicative of the total reflected radiation. For example for the sum signal the main scanning signal may be used, usually called central aperture signal (CA), or a combination of all sub-detector signals.

The control unit 20 controls the recording and retrieving of information and may be arranged for receiving commands from a user or from a host computer. The control unit 20 is connected via control lines 26, e.g. a system bus, to the other units in the device. The control unit 20 comprises control circuitry, for example a microprocessor, a program memory and interfaces for performing the procedures and functions as described below. The control unit 20 may also be implemented as a state machine in logic circuits.

For implementation of the focus unit 32 hardware and/or programmable signal processors may be used, such as a digital signal processor (DSP), while parts of the function may be implemented in a microprocessor.

The device is provided with recording means for recording information on record carriers of a writable or re-writable type. The recording means cooperate with the head 22 and front-end unit 31 for generating a write beam of radiation, and comprise write processing means for processing the input information to generate a write signal to drive the head 22, which write processing means comprise an input unit 27, a formatter 28 and a modulator 29. For writing information the power of the beam of radiation is controlled by modulator 29 to create the optically detectable marks in the recording layer.

In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

The control unit 20 is for controlling the recording in the recording mode. The control unit comprises a label control unit 34 for controlling the scribing in the label mode. Label data to be scribed may be provided via a host interface, or by user input, to the label control unit. In an embodiment a scanning device may be arranged only for label writing. The device is similar to the above device for recording, but the elements for data recording and retrieval are omitted.

In the label mode the record carrier is to be entered in the device with its label side towards the optical head to allow the beam of radiation to be focused to a scribing spot on the radiation sensitive layer. When a record carrier is entered, the user may give a command to engage the label mode. Alternatively the device may automatically detect if a suitable record carrier for label write has been entered, for example by detecting prescribed marks on a predefined location on the record carrier.

In practice the idea in label mode is to print labels at the non-data side of a CD or DVD disc. In both cases a CD laser in the optical head may be used to write the label. The CD spot is heavily aberrated with spherical aberration because the 1.2 mm polycarbonate substrate is not part of the light path anymore. Both radial and focus control is performed open loop.

An angular position of the head may be measured based on accurately controlling and measuring the rotation of the record carrier from a known reference position. Thereto the record carrier may have additional marks on the label side, such as a barcode, which may be detected by the head or by an additional sensor. Also, for example, the angular position may be based on signals from a Hall sensor coupled to a turntable motor, as described in a co-pending application of the current applicant (PHNL040725). A radial position of the head may be based on a stepping motor for equal sized, numbered, steps, or may be based on a rotation sensor coupled to a motor for moving the sledge along a spindle.

Focusing on the label might be performed using a method that is based on maximizing the reflectivity, which is measured from the so-called central aperture (CA) signal. This signal is sometimes called the sum signal. Basically it is the signal that describes the amount of light reflected from the disc. The signal can be generated from the sum of the detector segments corresponding to the main spot only. However, in a 3 spots system, it can also be based on the sum of the detector segments corresponding to the main spot+the sum of the detector segments corresponding with the satellite spots. However, the quality of such CA signal is low, a lot of noise is present in the signal. Therefore a lot of sampling or filtering is required to obtain reproducible results. An option would be to filter CA and then find the maximum. Unfortunately, filtering causes a delay in the filtered CA signal, which should be compensated for when finding the maximum.

In a focus control system described hereafter the CA signal is not directly filtered in the 'time domain', but a focus excitation signal is included in the focus control signal, and a deviation of the CA signal is correspondingly detected for calculating a center of gravity. The position of the center of gravity indicates the difference between the focus point and the surface of the medium. The focus excitation signal may be a wobble signal, i.e. a substantially sinusoidal periodic signal, disturbing the focus actuator to provide a deviation of the CA signal. One wobble period gives two measurement points by using each flank. Generally the wobble frequency is a multiple of the disc rotational speed. A suitable wobble frequency is 8 times the disc rotational speed which results in 16 measurement points over one revolution.

It is noted that other type of excitation signal or detection systems may be used for detecting deviation of the detector signal due to the excitation signal, e.g. a saw tooth excitation signal and detecting based on maximizing detected CA signal amplitude after filtering.

FIG. 3 shows detecting a center of gravity. In a diagram along the vertical axis a detector signal CA is given as a function of z, CA(z), and on the horizontal axis the displacement of the focus z is given. For example the displacement z may be controlled by a focus excitation signal included in the focus control signal 35. Basically the center of gravity of the CA signal is measured; the result is called z0. The center of gravity implies that a weighted surface on both sides of z0 is equal, in which a surface S is calculated by integrating the surfaces dA multiplied with the distance l to z0 according to the following formula:

$$\sum M_{z0} = 0 \Rightarrow \int_S l \cdot dA =$$

$$0 \Rightarrow \int_{-\infty}^{\infty} (z - z0) \cdot CA(z) dz = 0 \Rightarrow \int_{-\infty}^{\infty} z \cdot CA(z) dz = z0 \cdot \int_{-\infty}^{\infty} CA(z) dz$$

which results in $$z0 = \frac{\int_{-\infty}^{\infty} z \cdot CA(z) dz}{\int_{-\infty}^{\infty} CA(z) dz}$$

For the focus excitation signal a periodic signal may be applied, in particular a substantially sinusoidal signal. In the current case:

$$z = A \cdot \cos(2\pi f_N t) \Rightarrow dz = \frac{dz}{dt} \cdot dt = -2\pi f_N A \cdot \sin(2\pi f_N t) dt$$

If it is assumed that CA(z)=0 for large out-of-focus values of z, e.g. z>A or z<−A, then the measurement principle in the time domain is according to $$z_0 = \frac{\int_0^{T_p} z \cdot CA(t) \cdot \sin(2\pi f_N t) dt}{\int_0^{T_p} CA(t) \cdot \sin(2\pi f_N t) dt}$$

(called complete center of gravity formula COG) wherein $T_p$ is the measurement period related to the period of the periodic focus excitation signal, for example 0,5 times the period of a sinusoidal excitation signal. It is allowed to use a noisy, unfiltered and therefore fast, CA signal here, because the entire signal is integrated. This algorithm has advantages with respect to DSP and microprocessor implementation effort, calibration speed and simplicity. To perform such a measurement in a drive the focus actuator is moved with respect to the disc. In an embodiment of the invention, a linear saw tooth could be used. In that way a linear relation between z and time can be obtained which enables to perform the integration over z in time domain. However, a saw tooth will lead to higher harmonics in the actuator response, which will have negative influence on measurement accuracy and speed. Therefore, in another, preferred embodiment a flank of a harmonic signal to drive the focus actuator movement is used. As a result the relation between time and z is not linear any more. To perform the integrations over time instead of space the integrals have to be compensated with an additional harmonic $\sin(2\pi f_N t)$ as explained above. However, the inventors found out that this compensation is not always required for good convergence, and therefore detecting the center of gravity may be based on:

$$z_0 = \frac{\int_0^{T_p} z \cdot CA(t) dt}{\int_0^{T_p} CA(t) dt}$$

(called simplified center of gravity formula SCOG)

FIG. 4 shows a detector signal processing part. The Figure shows a CA signal processing principle to be implemented in a drive. Two integrators 51,52 for determining a numerator and denominator corresponding to the formula SCOG above are clearly visible. The focus excitation signal is a cosine generated as follows. A sync signal k is generated corresponding to a rotation of the medium, e.g. a tacho signal or a sensor signal generated by a barcode on the medium passing along a sensor (see FIG. 6). In a scaling unit 53 the sync signal k is scaled to get a preferred range, e.g. 0 . . . 1023 is scaled to 0 . . . (128*Nm−1) by multiplying by Nm (a number of periods of the periodic focus excitation signal) and dividing by 8. In a logical unit 54 the signal is logically AND with 7F(hex) to get a sequence of Nm=8 saw tooth shaped pulses, which are converted using SIN unit 55 and COS unit 56 to sinusoidal signals (sine and cosine respectively), for example based on a table of 128 values corresponding to the logical scaling applied earlier in units 53 and 54.

In section 50 the Figure shows a measurement period 503, for example the period being Td/3, i.e. one third of the rotation period which has Nm=3 periods of the focus excitation signal. The sine signal 504 is applied to detect the measurement interval (between zero values 501,502 of the sine signal 504) to reset the integrators 51,52 and hold units 59,60, and to generate an interrupt to indicate that a measurement period is completed. The cosine signal 505 is input to a multiplier 58, which further receives the detector signal CA via gain unit 57, which may have a low-pass filter function. The output of the multiplier 58 is integrated in integrator 51 and sampled in hold unit 59 to generate a numerator, while the detector signal CA is integrated in second integrator 52 and sampled in hold unit 60 to generate a denominator. Hence a zero crossing 501,502 in the sine of the same frequency is used to reset the integrators and store the result in the zero-order-hold units 59,60. When the integrators are reset an interrupt is generated to the microprocessor. This interrupt indicates that the microprocessor can sample the numerator and denominator.

If the measurement is carried out successfully, i.e. if the CA peak is on the flank, then dividing the numerator with the denominator gives the resulting z0. Note that if the focus set point is not within the range of the focus excitation signal, the CA signal will be about zero. This may be separately tested by the microprocessor before dividing, and larger amplitude for the focus excitation signal, or different global focus finding procedure, may be selected. Note that this division is preferably performed in the microprocessor and not in the DSP, where such a division is much more complex.

In an embodiment multiple measurements on one revolution are required, and the measurement harmonic should have a higher frequency then the disc rotational speed. To simplify signal processing further on, the measurement harmonic should be an integer number of the disc rotational speed Fd. In this case we choose this integer number to be N=8. On each cosine two measurement flanks are available. As a result we obtain 16 values for z0, equally distributed over one revolution. With these 16 values it is possible to obtain a DC value and 7 harmonics by an FFT procedure.

The focus unit 32 has a feed forward block to generate a focus correction signal based on the measurements of the focus error. The focus correction signal is a signal to be applied to a focus actuator so that the focus point of the beam of radiation closely follows the surface of the medium to be scanned, i.e. the focus correction signal corresponds to the height variations of the medium. For example the focus correction signal may be generated by linear interpolation, or as a feed forward signal based on the amplitudes of the harmonics calculated by the FFT as indicated above. Further details about detecting the center of gravity and generating a focus correction signal are described in co-pending patent application EP04104116.1 (PHNL040940) of the same applicant.

According to the invention the focus unit 32 has circuitry for detecting a focus error by including a focus excitation signal in the focus control signal and detecting a deviation in the detector signal in dependence of the focus excitation signal, as described above. In addition the label control means 34 are arranged for controlling the focus unit 32 in dependence on the label data to detect the focus error during said scribing and without interrupting said scribing. Usually a high laser power level will write a 'dark' dot onto the medium, referred to as colored dot, while a low laser power level will keep the disc in its original state at which the radiation sensitive layer is unaffected, referred to as uncolored dot. Different types of radiation sensitive layers may result in different effects of coloring.

It is to be noted that algorithms based on a focus excitation signal to control the focus actuator usually can not be used during the print process itself. The focus excitation signal amplitude, which will be simply called wobble further on, will degrade the printing quality because it is a focus disturbance. Secondly, the focus measurement accuracy is affected by the scribing, because the reflection is heavily influenced by the laser power level, which is switching from low to high during the print process. For example the outcome of the integrators 51,52 which are used to calculate z is not correct anymore. As a consequence the printing process is aborted to make learning process for focus possible. Aborting the print process increases the printing time, which negatively influences the drive specification. The current invention makes it possible to control focus during the scribing process. As a result the speed of the scribing process is increased, in practice by about 5 to 20%.

In particular the label control unit 34 is arranged for controlling the focus excitation signal and/or detecting said deviation in dependence on the label data. The focus excitation signal may be reduced in amplitude or disabled completely in sections of a trace where colored dots have to be scribed, or changed in frequency, to prevent detrimental effects on the quality of the dots. The detection of the deviation may be blocked in parts of traces having colored dots, or may be compensated or corrected by taking into account the differences in the reflected radiation due to the colored dots to prevent that the outcome of the focus error depends on the picture scribed. Various embodiments are given below. Note that, after a preceding focus learning process, fewer measurements of the focus error during writing of a medium may be well acceptable, because experiments have shown that especially the focus DC component may change in time, or with radial position of the writing head. The DC component can be easily updated based on a few measurements during scribing.

In an embodiment the frequency of the focus excitation signal is adapted in dependence of the scribing process. It is to be noted that at relatively low wobble frequencies, i.e. within the focus actuator frequency range substantially below the so-called "eigen" frequency, for example a wobble frequency of 25 Hz at an eigen frequency of 50 Hz, the actuator will closely follow the excitation signal without phase error, which is in terms of 'z'. At higher wobble frequency the direct relation with 'z' is not present anymore and only qualitative (direction) information may be obtained. A qualitative measurement provides a result obtained with a high wobble frequency, while no direct link to z is present. A quantitative measurement provides a result obtained with a lower wobble frequency, whereby a direct link to z is present. Note that qualitative measurements generally lead to slow focus convergence. Hence the focus system may first apply a low frequency before scribing, and subsequently apply a high frequency during scribing. The high frequency allows samples to be determined requiring smaller sections of a trace. In addition, it may have less detrimental effects on the visible quality of the label.

In an embodiment the wobble amplitude is made so small that no visible effects occur in the print process. In practice the allowable wobble amplitude is determined during design of a drive or a drive-disc combination. In any case, the small wobble will not allow larger focus errors to be detected, and usually results in a limited accuracy because the level of change in CA is very small resulting in a low signal to noise ratio. In a leaning process before scribing larger wobble amplitude may be used to set a feed forward focus control signal that compensates the larger focus errors. During scribing no further restrictions apply to wobble period (frequency), e.g. 8 periods per revolution is still possible.

In a further embodiment the wobble is disabled in sections where colored dots are written. As a result the print process in not influenced. A disadvantage is that in sections where colored dots are present no information is obtained to learn focus. To limit the size of these sections the wobble period may be made smaller, e.g. 100 wobbles within one revolution instead of only 8. At frequencies of 100 wobbles per revolution the phase and amplitude relation between position and actuator voltage is not equal to the phase and amplitude relation at the first harmonics (and DC) of the disc rotational speed. As a result, no quantitative information about "z" is given. Instead, only the direction of "z" is available and therefore only qualitative measurements are obtained. Note that the number of measurement points depends on the label picture to be scribed.

In a further embodiment the detection is blocked in sections where colored dots are present. For example the integrals are not calculated or discarded if more than a threshold number of colored are present in the integration domain. The threshold may be set to zero (or a relatively low number) in order to only calculate the integrals if the sections are (predominantly) uncolored. Note that especially at relative low wobble frequencies, e.g. 8 times the disc rotational speed, the number of measurements per revolution is small. If no substantially blank section of 360/16 degrees is available not a single measurement can be performed. Hence the wobble frequency may be increased, which will generally lead to more measurement points, however, at lower accuracy as elucidated above. However, in practice, after initially determining a feed forward signal accurately including a number of harmonics of a rotation of the medium, the zero order harmonic, i.e. DC value, is the most relevant parameter to correct during writing, and a single measurement is sufficient to determine a new value for the DC value.

In a further embodiment the focus unit 32 and the label control unit 34 are arranged for detecting said deviation in the detector signal by only detecting the detector signal for pairs of periods corresponding to pairs of, with respect to the center of the detection period, symmetrically positioned uncolored dots. Note that the focus excitation signal is symmetrical with respect to a center of a detection period, i.e. the zero crossing of a flank of the periodic excitation signal. Hence CA samples are disabled "mirror wise" around the center of the integration period. As a consequence a colored dot and the dot at its mirror position will not be sampled. Effectively this means that the outcome of the integration is the center of gravity of slightly modified CA peak. If the amount of colored dots is small, the outcome of the integration is still very accurate. Especially in the case of printing text it is possible to obtain accurate measurements on all sections. Note that a good performance is achieved during text printing, but performance depends on the picture, and a low wobble frequency is still possible, so quantitative information of the focus error is obtained (leading to fast convergence).

In a further embodiment of the focus unit 32 comprises a variable gain unit for matching, during scribing and in dependence of the radiation of the beam, detector signals for colored dots and uncolored dots. For example the amplifier 57 in the circuit shown in FIG. 4, has a variable gain controlled via a control input based on the type of dot to be scribed. The gain may be switched corresponding to the laser power, e.g. to a lower value when a high laser power is applied for forming a colored dot, and during an uncolored dot the detector gain is high. In an embodiment the speed of forming the colored dot is taken into account, and the gain may be adjusted along a gain profile in time when a writing pulse is applied. Hence the amplified CA signal is made substantially independent of the dot type, and the influence of laser power on the amplitude of CA is matched. The generation of the focus error signal can continuously proceed during printing of colored dots, uncolored dots or combinations. Note that no restrictions on picture (i.e. no blank sections are required) or on wobble frequency apply. However, care is to be taken to accurately match the CA signal of a colored dot and uncolored dot, as matching errors will result in focusing errors.

In further embodiments the focus unit 32 and the label control unit 34 are arranged to combine the above functions. For example small wobble amplitude is used to prevent picture degradation, and only blank sections are used to calculate measurement points. In practical implementations (having good qualitative, although low convergence, measurement results) a high wobble frequency may be applied (e.g. order of 100 times disc rotational speed). Alternatively small wobble amplitude may be used to prevent picture degradation, in combination with low wobble frequency, while allowing sections with a few colored dots as valid measurement points. At low wobble speeds this implementation leads to good quantitative (high convergence) measurement results (typical 8 times disc rotational speed). Also small wobble amplitude may be used to prevent picture degradation in combination with matching of the detector signal CA. There are no limitations for the wobble frequency and the measurement gives a constant and guaranteed number of measurement results.

In an embodiment the label control means 34 are arranged for controlling the focus unit 32 for, in adjacent traces of dots, controlling the phase and/or frequency of the focus excitation signal for reducing visible degradation of the label due to defocusing caused by the focus excitation signal. The phase of the focus excitation signal may be adapted in a regular or random pattern from trace to trace. Also the amplitude and/or the frequency of the focus excitation signal may be changed in a pattern from trace to trace and/or within traces. For example in some periods of the wobble the amplitude may be high, while in most periods the amplitude is low or zero. Also in some angular positions a low frequency wobble period may be applied, while in most sections a high wobble frequency applies. Further combinations to reduce visibility of the detrimental effects are easily conceived.

It is noted that enabling the focus excitation signal in substantially uncolored sections obviously may be combined with calculating the focus error only in such sections. Such solutions do not affect picture quality and give quantitative measurement points when a low wobble frequency is used and qualitative measurement results at high wobble frequencies. Note that disabling has no direct functional purpose when combined with detecting only pairs or matching the CA signals as described above, but still may be used at some (irregular) pattern to decrease the visible degradation of the focus excitation signal.

In all cases a sequence of measurement results for the focus error is obtained at the output. It is essential to recognize that in most cases, there is no guarantee for the number of valid points and the distribution over the revolution. The number of valid measurement results is between 0 and 2*fwobble/fdisc. In some cases there is a direct link between 'z' (low wobble frequencies) and in some cases this link is not present (high wobble frequencies). Based on these characteristics several controller strategies may be implemented in the focus unit 32. These strategies will be described below.

A first controller strategy is to update amplitudes of the harmonics in the feed forward block based on quantitative focus error measurements and FFT thereof. In this case the number of points is Fourier transformed and the result is added to the amplitudes in a feed forward block. This method should be applied at low wobble frequencies. The harmonics to be updated are restricted by the number of measurements within one revolution. Also, if some measurements are omitted, the missing values may be replaced by interpolation and/or using old values of preceding measurements.

A second controller strategy is to update amplitudes of feed forward block based on qualitative measurements. In principle this method is equal to the method describe above, however, more iterations are required to converge to a final solution. In addition, care should be taken to avoid instabilities. This method should be applied at high wobble frequencies (although it also works at low frequencies). The harmonics to be updated are restricted by the number of measurements within one revolution.

A third controller strategy uses a focus servo controller of the well known PI(D) type (proportional, integrating and (optionally) differentiating), combined with a learning memory feed forward unit. In this method a memory is used which contains a learned controller output. Furthermore each measurement result (obtained after half a wobble period) is fed into a PI(D) controller which tries to control its input to zero (controller setpoint is zero). The combined focus PI(D) and memory output is fed to the focus actuator. The memory input is learned from this combined signal. If a measurement point is not available the controller is put on hold and tracking is based on the memory only.

A fourth controller strategy uses a focus PI(D) controller only, i.e. without the memory loop. Such a controller can only be used if there is a certain guarantee for valid measurement results, because without a measurement the controller can not calculate the correct focus control signal. Therefore this controller strategy can only be applied in combination with regular measurements, such as small amplitude wobble combined with matching.

In the last two cases the relation between the bandwidth of the control loop and the actuator "eigen" frequency determines if a D action is required. Generally, for low bandwidths (typical 5 Hz) no D action is required. Note that a certain wobble frequency (speed of measurement) is required to obtain a certain bandwidth.

In an embodiment the focus control unit will administrate when and how focus is updated during write. If insufficient focus updates are made due to printing a lot of colored dots, the print process is aborted and a learning process is executed while applying only read power, optionally after moving the spot to a blank area at a different radial position of the medium. Note that this is relevant for most of the above options, except when a constant number of measurements is available independently of the label picture.

Although the invention has been mainly explained by embodiments using optical discs having a label layer, the invention is also suitable for other record carriers such as rectangular optical cards, magneto-optical discs or any other type of medium that may be scanned via a beam of radiation. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. A device for scanning a medium and scribing a visible label on the medium, the medium having a label side provided with a radiation sensitive layer for creating the visible label by scribing traces of dots via a beam of radiation, the device comprising:
    a head or providing the beam of radiation for, in a label mode, generating a scribing spot on the radiation sensitive layer for scribing the visible label, and for generating at least one detector signal in dependence of radiation reflected from the medium;
    a control unit comprising label control means for controlling the scribing in dependence of label data; and
    focus means for generating a focus control signal for focusing the scribing spot,
    the focus means being arranged for detecting a focus error by including a focus excitation signal in the focus control signal and detecting a deviation in the at least one detector signal in dependence of the focus excitation signal,
    the label control means being arranged for controlling the focus means in dependence on the label data to detect the focus error during said scribing and without interrupting said scribing,
    wherein the focus excitation signal has a first amplitude during a learning process while not scribing and a second amplitude during said scribing, the second amplitude being substantially smaller than the first amplitude.

2. The device as claimed in claim 1, wherein the label control means are arranged for at least one of controlling the focus excitation signal and detecting said deviation in dependence on the label data.

3. The device as claimed in claim 2, wherein the label control means are arranged for only enabling detecting said deviation in selected sections of the traces of dots, wherein the selected sections substantially only contain uncolored dots where at the uncolored dots the radiation sensitive layer is unaffected.

4. The device as claimed in claim 2, wherein the label control means are arranged for only including the focus excitation signal in selected parts of the traces of dots, wherein the selected parts substantially only contain uncolored dots where at the uncolored dots the radiation sensitive layer is unaffected.

5. The device as claimed in claim 2, wherein the focus excitation signal is symmetrical with respect to a center of a detection period, and the focus means are arranged for detecting said deviation in the at least one detector signal by only detecting the at least one detector signal for pairs of periods corresponding to pairs of, with respect to the center of the detection period, symmetrically positioned dots of a same type.

6. The device as claimed in claim 2, wherein the focus means comprise a variable gain unit for matching, during scribing and in dependence of the radiation of the beam, detector signals for colored dots and uncolored dots, where at the uncolored dots the radiation sensitive layer is unaffected.

7. The device as claimed in claim 1, wherein the focus excitation signal has a first frequency during a learning process while not scribing and a second frequency during said scribing, the second frequency being substantially different from the first frequency.

8. The device as claimed in claim 1, wherein the label control means are arranged for controlling the focus means for, in adjacent traces of dots, controlling at least one of a phase and a frequency of the focus excitation signal for reducing visible degradation of the label due to defocusing caused by the focus excitation signal.

9. The device of claim 1, wherein the focus excitation signal has a first frequency before the scribing, and a second frequency during the scribing, the first frequency being lower than the second frequency.

10. A method of scribing a visible label on a medium via a beam of radiation for use in a scanning device,
    the medium having a label side provided with a radiation sensitive layer for creating the visible label, the method comprising the act of:
    generating a scribing spot on the radiation sensitive layer for scribing the visible label;
    generating by a focus unit a focus control signal for focusing the scribing spot;
    detecting a focus error by including a focus excitation signal in the focus control signal and detecting a deviation in a detector signal in dependence of the focus excitation signal, wherein the focus excitation signal has a first amplitude during a learning process while not scribing and a second amplitude during said scribing, the second amplitude being substantially smaller than the first amplitude;
    controlling the scribing in dependence of label data; and
    controlling the focus unit in dependence on the label data to detect the focus error during said scribing and without interrupting said scribing.

* * * * *